Aug. 10, 1965 N. P. MATHIESEN 3,199,513

MAGNETIC CARD FILING DEVICE

Filed Nov. 30, 1962 2 Sheets-Sheet 1

INVENTOR

Nicolaus Per Mathiesen

BY Watson, Cole, Grindle + Watson

ATTORNEYS

MAGNETIC CARD FILING DEVICE

Filed Nov. 30, 1962 2 Sheets-Sheet 2

INVENTOR
Nicolaus Per Mathiesen

BY Watson, Cole, Grindle + Watson
ATTORNEYS 3,199,513
Patented Aug. 10, 1965

1

2

3,199,513

MAGNETIC CARD FILING DEVICE

Nicolaus Per Mathiesen, 1512 Primm Ave.,
San Jose 22, Calif.

Filed Nov. 30, 1962, Ser. No. 241,398
3 Claims. (Cl. 129—16)

The present invention relates to card index devices of the type in which magnetic forces are utilized for causing a plurality of cards, resting on their lower edges in a tray or drawer, to fan out or separate toward their upper edges, thus facilitating the making of a visual survey of the cards. One such device is disclosed in my United States Patent No. 2,341,639, granted Feb. 15, 1944, and a general object of the present invention is to provide an improvement upon the device disclosed in said patent.

Patent No. 2,341,639 describes and illustrates a device in which the individual index cards are provided with magnetic portions or inserts, for example, very thin pieces of soft iron laminated between the layers of paper of which the card consists, a plurality of such cards being disposed edgewise, in face-to-face relation, within a tray or drawer having vertical sides. Magnets are disposed longitudinally of the tray or drawer and laterally beyond the side walls thereof, the fanning out of the cards being caused by magnetic repulsion between the soft iron inserts of adjacent cards, in which magnetic poles of like polarity are induced by reason of the external magnetic fields generated by the aforementioned magnets. In a device of this kind, when a card is lifted from the tray or drawer, the remaining cards spontaneously shift their positions to restore uniformity to the fan. Thus, if it is desired, for convenience, to indicate the location at which the withdrawn card is to be re-introduced into the group of cards, it is necessary to insert a "flag," namely, an object of some kind which will serve to visually indicate such location. A principal object of the present invention is to provide means whereby, when a card is lifted from the group, the adjacent cards may be caused to remain apart, thus preserving a wedge-shaped opening in the group of fanned-out cards at the precise location where a card has been removed, and is to be re-introduced.

More specifically, it is an object of the invention to provide a card filing device comprising a container having opposed side walls, opposed end walls and a bottom, and means for establishing a horizontal series of magnetic fields of alternately reversed polarity adjacent each said side wall, each said magnetic field extending into said container over a part of the length of the adjacent side wall, the magnetic fields extending toward each other from opposite sides of the container being of equal longitudinal extent and disposed in transverse alignment. When a group of cards having soft iron inserts, as mentioned above, are distributed in such a container they will fan out, as described in my aforesaid patent, but the fan will not be uniform, in that wedge-shaped openings in the fan will occur at the points of reversal of polarity of the magnetic fields arranged in series along each side of the container. Accordingly, in order to leave such an opening as an indication of where a particular card has been withdrawn, it is only necessary to move the desired card, about its lower edge as a fulcrum, to a position in which the magnetic areas of the card are opposite the aforesaid points of polarity reversal, then withdraw the card. The opening or "split" will form and remain as described above.

A further object is the provision of a device as described in the preceding paragraph, the magnetic fields on opposite sides of the container being of equal vertical extent and disposed at like elevations above the container bottom. This arrangement is optimum for obtaining the effect noted above.

Another object is the provision of such a device in which magnetic fields extending toward each other from opposite sides of the tray are of like polarity, which arrangement also enhances the effect noted above.

A further object of the invention is the provision of a device of the kind described, in which the means for establishing the magnetic fields comprises a plurality of permanent magnets arranged in two opposed series, the magnets of each series being disposed in side-by-side relation with their magnetic axes disposed crosswise of the container and their polarities alternating. Preferably, the magnets of each series are separated by substantial and equal gaps but they may, as hereinafter pointed out, be positioned immediately adjacent each other.

Another object is the provision of such a device in which the magnetic fields are established by means of ceramic permanent magnets, which are found particularly suitable for the purpose.

It is also an object of the invention to provide a device of the kind described, in which the side walls of the container are formed of steel, and the permanent magnets are properly positioned by simply adhering them magnetically to the respective side walls, in the positions and magnetic arrangements desired, as already described. With the magnets thus arranged on the inner surfaces of the respective side walls of the container, the said side walls absorb all of the magnetic lines of force which might otherwise extend laterally outward from the container, thus avoiding magnetic disturbances which might otherwise be caused. For example, a plurality of such containers may be arranged in side-by-side relation, without the magnets of any container having an adverse effect upon the functioning of an adjacent container. Similarly, a container may constitute the drawer of a steel filing cabinet, yet the permanent magnets disposed along the inner surface of the side walls of the container will not affect the mechanical functioning of the drawer, nor affect the magnetic functioning of adjacent drawers. Preferably, each container is provided with liners of non-magnetic material disposed inwardly of the respective series of magnets, to serve as guides for the cards and prevent the latter from adhering to the magnets on either side of the container.

Another object is the provision of a device of the character described, comprising two horizontal series of magnets on either side of the container, for use in conjunction with large or heavy cards containing larger areas of magnetic material.

Other and further objects, features and advantages will be apparent from the description which follows, read in connection with the accompanying drawings, in which.

In order to facilitate an understanding of the invention, reference is made to the embodiments thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Figure 1:
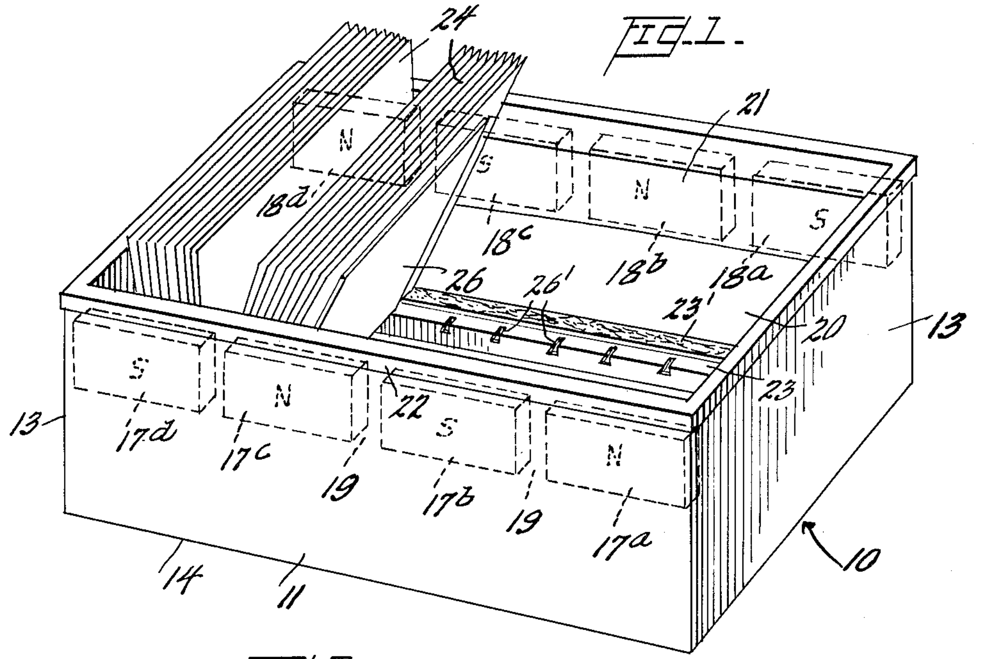
FIGURE 1 is a perspective view of a device constructed in accordance with the invention.
Figure 2:
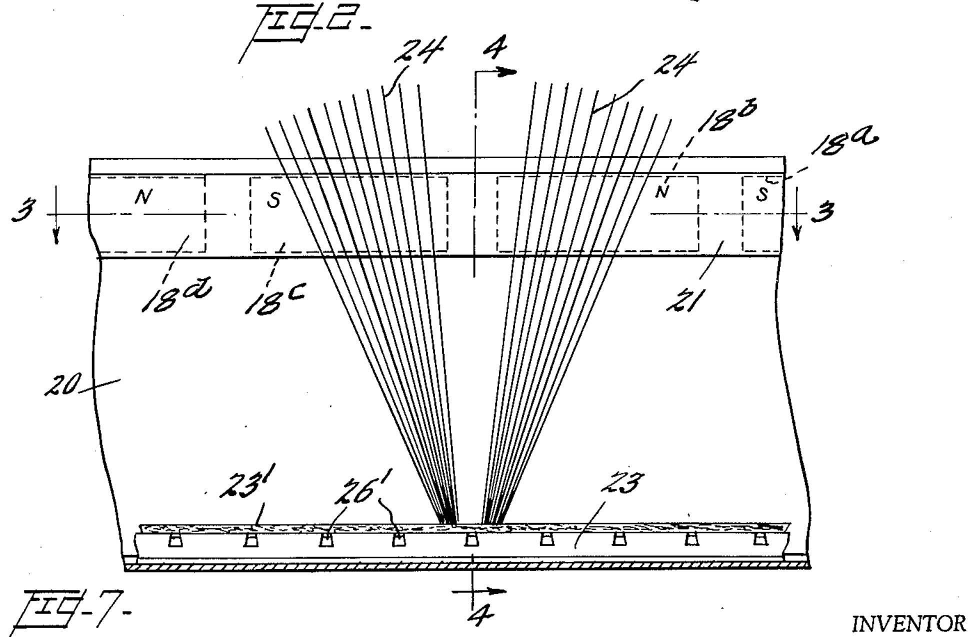
FIGURE 2 is a fragmentary longitudinal vertical sectional view of the device of FIGURE 1.
Figure 3:
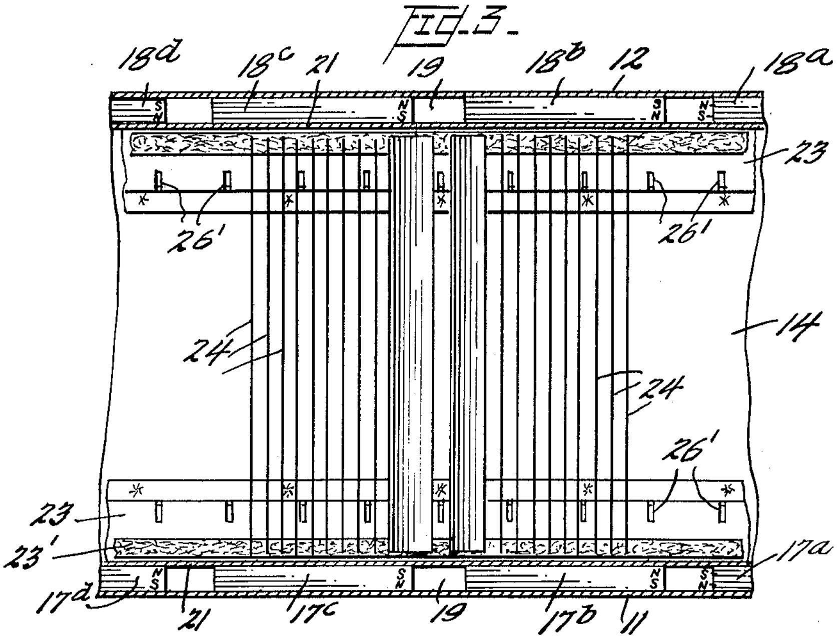
FIGURE 3 is a horizontal section on line 3—3 of FIGURE 2.
Figure 4:
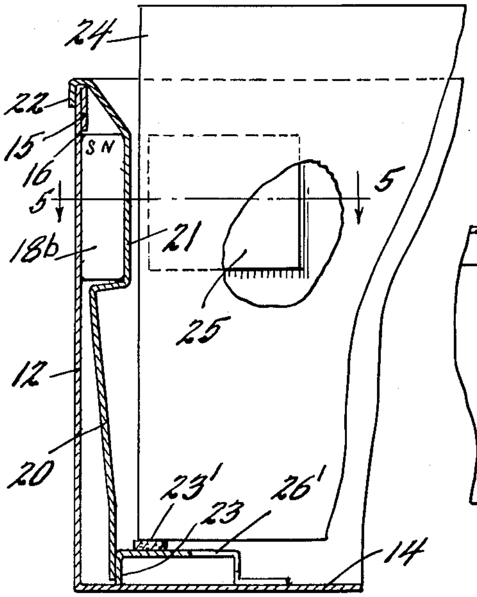
FIGURE 4 is a vertical section on line 4—4 of FIGURE 2.

Referring now to FIGURES 1, 2 and 3, the rectangular container 10 comprises side walls 11, 12, end walls 13 and a bottom 14, and is fabricated in any suitable manner, preferably of steel. As seen in FIGURE 4, the upper edges of the side and end walls are preferably turned over as at 15, which enhances the strength of the container, the edges 16 of the turned-over portions serving also as a guide for positioning of the permanent magnets 17*a*, 17*b*, etc., and 18*a*, 18*b*, etc. The latter are preferably of the ceramic type and are magnetized with their magnetic axes extending crosswise of the container 10 and with alternating polarities, in each series extending along a side of the container, as indicated in FIGURE 1. Preferably, the magnets which lie opposite each other on the respective sides of the container have facing poles of like polarity, as also indicated in FIGURE 1. The magnets of each series are preferably separated by substantial and equal gaps 19, and are magnetically adhered to the side walls 11 and 12 with their upper edges abutting the edges 16 of the down-turned portions 15 of the respective walls.

Liners 20 of non-magnetic material, for example, aluminum are disposed inwardly of the magnets and are formed with offset portions 21 (FIGURE 4) to accommodate the magnets. The upper edges of the liners 20 are turned over the upper edges of the respective side walls 11 and 12, as indicated at 22 in FIGURE 4, and the lower margins of the liners 20 incline inwardly and resiliently engage the adjacent sides of the longitudinally disposed inverted channel members 23, which are spot-welded or otherwise secured to the bottom 14. Felt strips 23' preferably are adhered to the upper sides of members 23 to provide resilient seats for the cards 24.

The cards 24 adapted for use in the described container are provided with inserts 25 of magnetic material, for example, soft iron, positioned near each lateral edge of each card, which inserts 25 are adapted to intercept a substantial proportion of the lines of force extending laterally inwardly from the adjacent permanent magnets 17 or 18. As now well understood in the art, magnetic poles of like polarity are induced in identical locations in those cards which lie opposite a particular magnet, causing the cards to separate or "fan out" through magnetic repulsion acting between the respective magnetic inserts 25. Arrangement of the magnets on both sides of the container produces like phenomena on both sides and the fan is therefore symmetrical. The cards 24 are supported by the members 23 with a minimum of frictional resistance to the fanning action, and are prevented from adhering to the magnets 17 or 18 by reason of the liners 20. The cards may be, if desired, separated into groups by the use of any suitable dividers 26 (FIGURE 1) positioned in selected slots 26' of the members 23 (FIGURE 4).

As illustrated in FIGURES 1, 2 and 3, a group of cards which occupies a position encompassing one of the gaps 19 will separate into two fanned out portions, leaving a wedge-shaped opening or "split" therebetween. This effect is brought about by the reversed polarities of the magnetic fields extending into the container on the respective sides of the gap 19. The induced magnetic fields in the inserts 25 of all the cards lying opposite a particular magnet, for example, the magnet 18*c* in FIGURE 1, being of similar distribution and polarity, the inserts are repelled by each other to cause the cards to form a fan lying opposite the magnet 18*c*; and those inserts lying opposite magnet 18*d*, being similarly though oppositely affected, are mutually repelled to form the fan lying opposite that magnet. However, the inserts having induced north poles are repelled much more strongly by the adjacent very strong north pole of the magnet 18*d* than they are attracted by the induced south poles of the card inserts lying opposite the magnet 18*d*, and thus the split between the two groups of cards is occasioned. A like phenomenon occurs on the opposite side of the container. Arranging the magnets with like poles facing each other, crosswise of the container, encourages compactness, hence greater intensity, of the respective magnetic fields and thus enhances the effect noted.

When it is desired to remove a card 24 from the file, and to leave an opening to indicate where such card has been removed, and is to be re-introduced, it is only necessary to move the card in question to a point opposite a gap 19. A split will then automatically develop between the cards in front and in back, respectively, of the card which is to be removed, and the latter may be removed, examined or used and replaced without the necessity of employing any other means to indicate its proper position in the group.

Figure 7:
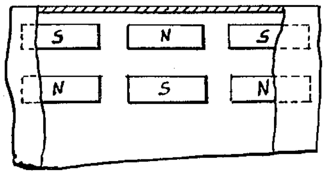
FIGURE 7 is a view similar to FIGURE 6 illustrating a further modification.
Figure 6:
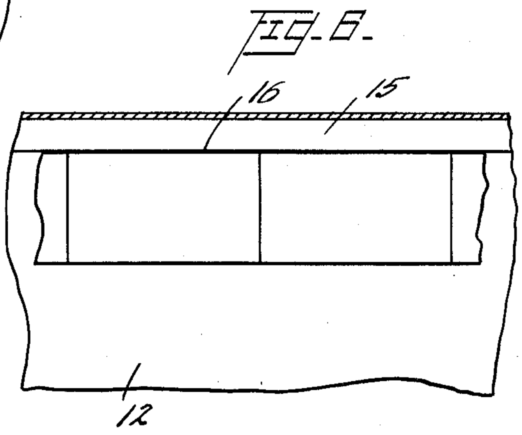
FIGURE 6 is a fragmentary longitudinal vertical section illustrating a modified arrangement of the permanent magnets.
Figure 5:
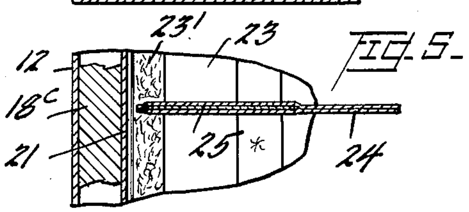
FIGURE 5 is a horizontal section taken on line 5—5 of FIGURE 4.

The same effect is achieved, but with the split somewhat narrower in extent, if the magnets of each lateral series are placed in close engagement with each other, as illustrated in FIGURE 6. For use with cards which are especially large or heavy, having large magnetic inserts, two rows of magnets may be positioned on each side of the container, as illustrated in FIGURE 7. In this case, the polarities of the upper and lower rows should be reversed, as indicated.

Having thus described the invention, what is claimed as new and desired to be secured by Letters Patent is:

1. A card filing device comprising a tray having opposed side walls, opposed end walls and a bottom, and means for establishing a horizontal series of magnetic fields of alternately reversed polarity immediatey adjacent each said side wall, each said magnetic field extending into said tray for a part of the length of the adjacent side wall, the magnetic fields extending toward each other from opposite sides of the tray being of equal longitudinal extent and being disposed in transverse alignment, and a liner of non-magnetic material disposed inwardly of each said side wall and defining a space between said liners for the reception of file cards, said means comprising a plurality of permanent magnets arranged in two opposed series, the magnets of each series being disposed in side-by-side relation with their magnetic axes disposed crosswise of said tray and their polarities alternating, said side walls being of steel and said magnets being adhered directly to the infacing surfaces of said side walls by magnetic attraction.

2. A device according to claim 1, said liners of non-magnetic material being disposed inwardly of and closely adjacent to each said series of magnets.

3. A card filing device comprising a tray having opposed side walls, opposed end walls and a bottom, and means for establishing a horizontal series of magnetic fields of alternately reversed polarity immediatey adjacent each said side wall, each said magnetic field extending into said tray for a part of the length of the adjacent side wall, the magnetic fields extending toward each other from opposite sides of the tray being of equal longitudinal extent and being disposed in transverse alignment, and a liner of non-magnetic material disposed inwardly of each said side wall and defining a space between said liners for the reception of file cards, said means comprising a plurality of permanent magnets arranged in two opposed series, the magnets of each series being disposed in side-by-side relation with their magnetic axes disposed crosswise of said tray and their polarities alternating, the magnets of each series being separated by substantial and equal gaps, said liners defining parallel sides for said space between them and isolating the magnets from said space, and means at the bottom of said tray for supporting a plurality of cards on edge within said space for relative fanning movement parallel to said sides about their supported edges.

References Cited by the Examiner

UNITED STATES PATENTS

| | | | |
|---|---|---|---|
| 2,341,639 | 2/44 | Mathiesen | 129—16 |
| 2,722,936 | 11/55 | Mathiesen | 129—16 |
| 2,848,227 | 8/58 | Gulick | 271—18 |

FOREIGN PATENTS

| | | |
|---|---|---|
| 573,238 | 11/45 | Great Britain. |

CHARLES A. WILLMUTH, *Primary Examiner.*

JEROME SCHNALL, *Examiner.*